United States Patent [19]

Clenney

[11] 4,205,204
[45] May 27, 1980

[54] TELEPHONE LOOP EXTENDING APPARATUS

[76] Inventor: Richard W. Clenney, 812 59th St., NW., Bradenton, Fla. 33505

[21] Appl. No.: 954,370

[22] Filed: Oct. 25, 1978

Related U.S. Application Data

[63] Continuation-in-part of Ser. No. 775,429, Mar. 8, 1977, Pat. No. 4,140,881.

[51] Int. Cl.² ............................................. H04M 1/76
[52] U.S. Cl. ................................................... 179/16 F
[58] Field of Search ............ 179/16 A, 16 AA, 16 F, 179/18 FA, 18 F, 81 C, 84 L

[56] References Cited

U.S. PATENT DOCUMENTS

| | | | |
|---|---|---|---|
| 3,504,127 | 3/1970 | Slana | 179/16 F |
| 3,508,009 | 4/1970 | Henry et al. | 179/16 F |
| 3,626,101 | 12/1971 | Fitzsimons et al. | 179/16 F |
| 3,627,952 | 12/1971 | Person | 179/16 F |
| 3,757,052 | 9/1973 | Tothill | 179/16 F |
| 3,783,198 | 1/1974 | Couch | 179/18 FA |
| 3,828,139 | 8/1974 | Chambers, Jr. | 179/16 F |
| 3,872,258 | 3/1975 | Chambers, Jr. | 179/16 F |
| 3,889,066 | 6/1975 | Simokat et al. | 179/16 F |
| 4,024,351 | 5/1977 | Ingle | 179/16 F |
| 4,127,747 | 11/1978 | Levi | 179/16 F |

*Primary Examiner*—James W. Moffitt
*Assistant Examiner*—Randall P. Myers
*Attorney, Agent, or Firm*—Jones, Thomas & Askew

[57] ABSTRACT

A subscriber loop extender for a telephone system in which a variable shunt conductance (41) is placed across the loop in response to a loop current indicating an off hook condition (32). An optical coupler (39) using a photo-resistor (41) or a photo-transistor as the variable conductance and a light source (40) responsive to loop current raises the value of the shunt conductance until sufficient current flows through the shunt to activate a central office relay (25). An SCR (48), the gate (47) of which is sensitive to the shunt current, extinguishes the light source thus removing the shunt from the loop. Loop current must fall to a level below the relay holding current to extinguish the SCR, thus providing hysteresis to the circuit. False ring trip is avoided by removing the shunt during each positive ringing pulse before its value increases so as to draw current to trip the ring. A second SCR (69) is provided to defeat slow decay of the photo-resistor conductance during dial pulses.

11 Claims, 2 Drawing Figures

TELEPHONE LOOP EXTENDING APPARATUS

CROSS-REFERENCE TO RELATED APPLICATION

This application is a continuation-in-part of my co-pending application Ser. No. 775,429 filed Mar. 8, 1977 now U.S. Pat. No. 4,140,881.

BACKGROUND OF THE INVENTION

In telephone transmission circuits a certain amount of loop or line current is needed to properly operate a subscriber's central office line equipment. Loop current is typically the current flowing in a subscriber's loop which comprises a two conductor cable that connects the subscriber's telephone to the central office. In a given telephone circuit, the amount of loop current is limited by the resistance of the cable's conductors which is a function of cable length. Thus the maximum resistance which the cable presents to the central office limits the maximum distance a subscriber's telephone may be located from the central office equipment and still successfully operate that equipment. The normal loop resistance limit of a telephone central office is usually determined by the ring trip current which flows in the loop to trip the ring or the current required to pull in a relay connecting the subscriber's loop to a line finder at the central office.

In recent years a trend toward wider geographical distribution of a single telephone exchange has developed, thus necessitating subscriber loops which are longer than the normal loop resistance would allow. The use of one central office to provide service to a wide geographic area has allowed the cost of telephone service to surburban and rural areas to be minimized.

In the past, various methods have been employed in order to extend the allowable distance between a subscriber's telephone and the central office equipment. Arrangements whereby the voltage across the loop has been boosted have been used but they are usually somewhat complex and expensive to manufacture and also increase the currents drawn by shunt faults in the telephone cable.

Another method of drawing sufficient current to trip the ring or pull in a line finder relay has been to connect a shunt across the loop in order to increase the current drawn from the central office when a sensing device senses an off hook current present in the subscriber's loop. Such devices have drawbacks in their use, including the fact that maintenance of a shunt across the line after the ring is tripped or a line finder relay is pulled in also shunts the subscriber's telephone during its use and tends to degrade the signal level. Furthermore, such devices are prone to false ring trip in that they may be activated by the high voltage AC ringing signal present across the subscriber's loop when the telephone is ringing.

SUMMARY OF THE INVENTION

The present invention provides a subscriber loop extender which is reliable, inexpensive to construct, and not prone to providing false ring trip.

According to one aspect of the present invention a variable conductance shunt is placed across this subscriber loop, the conductance of which is increased by a control circuit when loop currents indicating an off hook telephone on the loop are present. The control circuit is sensitive to the current flowing through the shunt conductance and when a predetermined level of shunt current is obtained, that shunt current in combination with current through the off hook telephone is sufficient to pull in the central office relay, the control circuit decreases the shunt conductance by several orders of magnitude, thus effectively removing the shunt from the line.

Circuit parameters are selected so that the shunt conductance is not increased in response to "leak A" currents in the loop and so that the conductance is not increased to a level which will draw DC ring trip current during the presence of an AC ringing voltage on the loop.

According to another aspect of the present invention, a variable shunt conductance in the form of a photoresistor or photo-transistor is placed across the subscriber loop. The shunt is optically coupled to a light source such as a light emitting diode which is responsive to loop current. The light source is itself shunted by a switching device, such as a silicon control rectifier, the operation of which is controlled by the current in the shunt. When sufficient current is present in the shunt to assure operation of central office equipment, the switching device turns on thus extinguishing the light source and substantially removing the shunt from the subscriber loop.

According to the another aspect of the present invention, the switching device has a hysteresis characteristic which assures that the current in the loop must fall below the holding current of the central office equipment before the shunt conductance will again be rendered responsive to loop current. Further beneficial aspects and features of the present invention will be apparent from the detailed description below.

DETAILED DESCRIPTION

Figure 1:
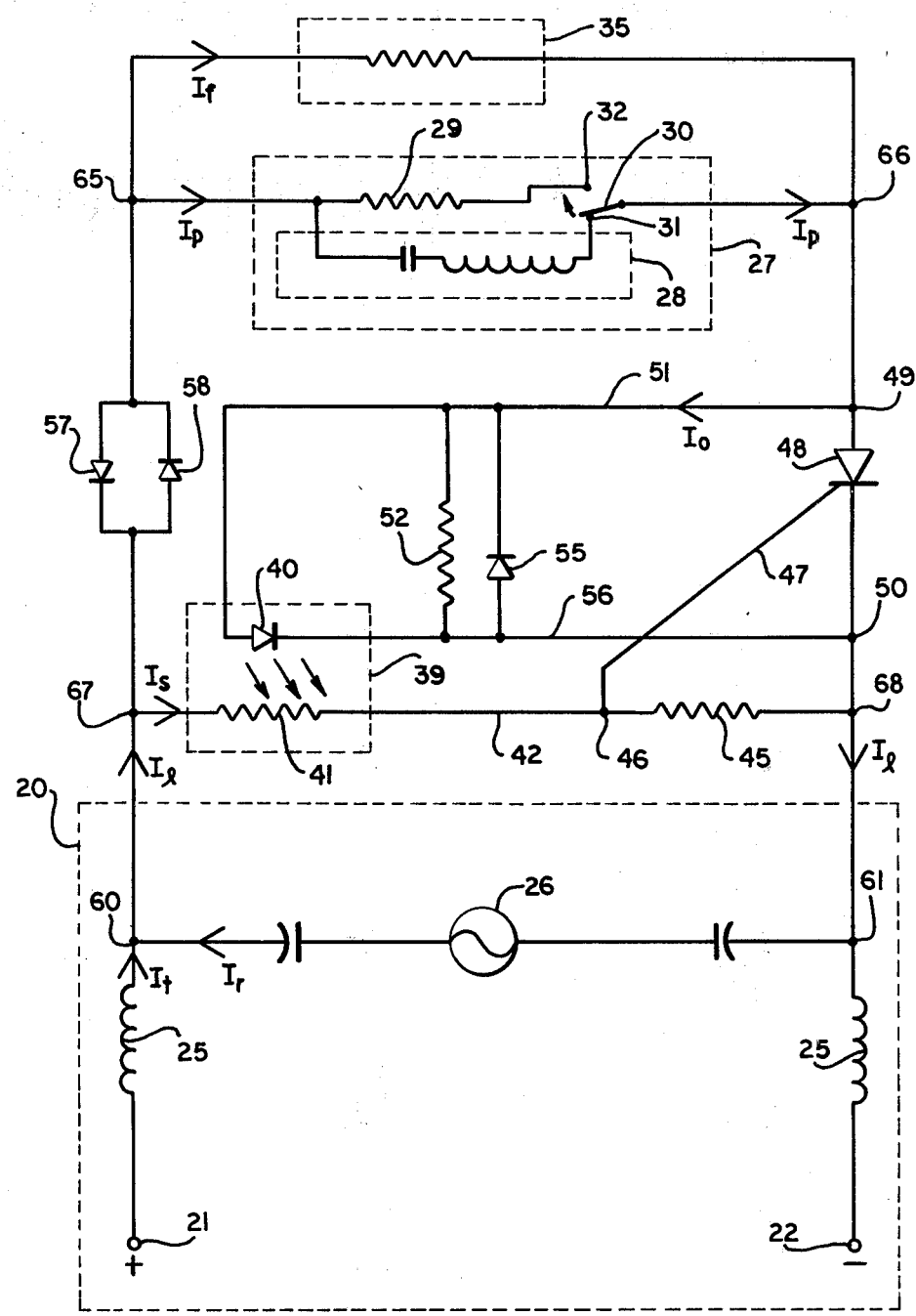
FIG. 1 is a schematic diagram of a first preferred embodiment of the present invention.

FIG. 1 shows the present invention in its environment of a conventional telephone system. The conventional telephone system includes central office 20 having a tip line 21 and a ring line 22. Coils shown as 25 represent the coils of either a ring trip relay or a relay connecting the loop to a line finder and will be referred to as central office relay 25. Central office 20 also includes a conventional alternating current ring voltage generator 26 for applying approximately 150 volts AC across the loop when the subscriber is receiving an incoming call. At the termination of the subscriber loop is a telephone shown as 27 in FIG. 1. Telephone 27 includes a ring detector 28 which is shown as a series capacitance inductance circuit in FIG. 1. Telephone 27 also includes an off hook resistance shown as 29 in FIG. 1 and a double throw hook switch 30 (shown in the on hook position) which may be connected to ring detector 28 at point 31 when on hook or to telephone resistance 29 at point 32 when telephone 27 is off hook. It will be understood by those skilled in the art that the elements shown schematically as telephone 27 in FIG. 1 are electrical models for the important features of a conventional telephone which must be considered as part of the environment of the present invention.

FIG. 1 also shows a leakage conductance 35 shunting the subscriber loop. Such a leakage is conventionally referred to as "leak A" and represents a specified maximum value for a shunt conductance from faults in telephone cable due to wet cables, break down of inter-conductor insulations and so forth. This specified maximum conductance represents the cummulative effect of leakage across the loop for which the subscriber telephone and the central office equipment must still operate properly. It is common today to specify that a given subscriber loop must operate properly with a resistance of 10,000 ohms across the line.

As may be seen from FIG. 1, the first preferred embodiment of the present invention includes an optical coupler 39 comprising light emitting diode 40 and photo-resistor 41. As will be obvious to those skilled in the art optical couplers using photo-transistors, light activated SCRs, or other photo responsive devices can easily be used in place of the optical couplers shown as 39.

Photo-resistor 41 is in series with a shunt conductor 42 and resistor 45. As may be seen from FIG. 1 the series combination of photo-resistor 41, conductor 42 and resistor 45 shunts the subscriber loop. Connected at point 46 of shunt conductor 42 is the gate 47 of SCR 48. The anode of SCR 48 is connected at point 49 and the cathode at point 50. Connected at point 49 is conductor 51 which in part connects light emitting diode 40, resistor 52 and diode 55 in parallel with SCR 48, the path to the cathode of SCR 48 being provided by conductor 56. Diodes 57 and 58 help maintain longitudinal balance of the subscriber loop in that they present similar characteristics to either SCR 48 or light emitting diode 40 with respect to diodes 57 and 58.

Various currents shown as "I" with a subscript have been designated on FIG. 1 and these currents will flow through the loop and components of the preferred embodiment during its operation which is described hereinbelow. For a subscriber loop extender such as the present invention to operate properly, it must assist telephone 27 and operating equipment at central office 20 under the following conditions. It must operate properly without a leakage conductance 35 across the loop and with the maximum specified value for a particular conventional telephone system of leakage conductance 35. The subscriber loop extender must also be able to detect current in the loop indicating that telephone 27 is off hook and draw additional current from central office 20 in order to pull in central office relay 25. Furthermore, the subscriber loop extender must not mistake currents from ring voltage generator 26 as off hook currents and thus falsely trip the ring before telephone 27 goes off hook.

As is known to those skilled in the art, a conventional central telephone office 20 includes a DC battery (not shown) which maintains approximately 50 volts DC between tip 21 and ring 22. This is the source of DC current flowing in the subscriber loop. The basic operation of the preferred embodiment of the present invention is achieved by making light emitting diode 40 sensitive to currents in the subscriber loop under certain conditions so that the diode will emit light and substantially lower the resistance of photo-resistor 41, thereby increasing current $I_s$ until current $I_1$ is sufficient to pull in relay 25.

As may be seen from FIG. 1, gate 47 of SCR 48 is connected to shunt conductor 42 at point 46 and cathode to gate resistor 45 is selected such that when an amount of shunt current, $I_s$, is flowing through shunt conductor 42 that will assure the pulling in of central office relay 25, SCR 48 will fire thus providing a voltage between points 49 and 50 approximately equalled to the voltage drop of one forward biased pn junction. This voltage will be maintained between conductors 51 and 56 and thereby will be maintained across light emitting diode 40 while SCR 48 is conducting. As is known to those skilled in the art, light emitting diodes typically require a forward voltage drop greater than the drop across a forward biased pn junction and thus the firing of SCR 48 will shunt light emitting diode 40 which will then be darkened. The darkening of light emitting diode 40 will raise the resistance of photo-resistor 41 (typically on the order of megohms) thus effectively removing the shunt comprising photo-resistor 41, conductor 42, and resistor 45 from the loop.

Consider first the operation of the subscriber loop as shown in FIG. 1. Switch 30 is connected to point 31 thus showing that telephone 27 is on hook. As may be seen from FIG. 1, ring detector 28 is substantially an open circuit to DC and therefore $I_p$ will be 0. Ring voltage generator 26 is not operative and therefore $I_r$ will be 0. Assume that photo-resistor 41 is at its maximum resistance (on the order of 4 megohms) and thus $I_s$ will be on the order of 10 microamps and thus may effectively be considered 0. Under these conditions it may be seen from inspection of FIG. 1, that $I_1$ will equal $I_t$ and these will further equal $I_f$, the current through leakage conductance 35. Under optimal conditions leakage conductance 35 will be 0 and no current will flow in the loop. Under worse allowable case conditions, $I_f$ will be on the order of 5 milliamps which will flow to point 49 and through conductor 51. Therefore it may be seen, that with telephone 27 on hook, $I_o$ (the current in conductor 51) will equal $I_f$. Resistor 52 is chosen so that the maximum allowable value of $I_f$ when flowing through the parallel combination of light emitting diode 40 and resistor 52, will be insufficient to cause light emitting diode 40 to emit light. This assures that the value of the conductance of photo resistor 41 will not be raised in response to the maximum allowable leakage current ($I_f$) which may be present in a subscriber loop.

Next consider the case of telephone 27 going off hook, thus connecting hook switch 30 to position 32 and thereby connecting off hook resistance 29 across the loop between points 65 and 66. This will cause a DC current $I_p$ to flow between points 65 and 66. In a conventional subscriber loop, without the aid of a subscriber loop extender, this current $I_p$ must be sufficient to pull in relay 25 at the central office. Assume however that in the case shown in FIG. 1, where telephone 27 is a long distance from central office 20 that the current $I_p$ induced by off hook resistance 29 is insufficient to pull in relay 25. Note that in this case $I_1$ equals $I_t$ (the current through the coil of relay 25) and will have a minimum value of $I_t$ and a maximum value of $I_t$ plus $I_f$. For a typical conventional telephone, a minimum of approximately 20 milliamps may be required to properly operate telephone 27. Consider that the pull in current required to pull-in relay 25 is on the order of 40 milliamps for a conventional central office relay and that the holding current required by the relay is less than 20 milliamps. As will become apparent hereinbelow, when telephone 27 goes off hook, SCR 48 will be nonconducting and the very low conductance of photo-resistor 41 when light emitting diode 40 is darkened will not allow sufficient current to flow into gate 47 to fire the SCR 48. Under these circumstances all of current $I_p$ will appear as a component of current $I_o$ in conductor 51.

As will be known to those skilled in the art, light emitting diodes are conventionally available which will not light when currents on the order of 5 milliamps flow to the parallel combination of light emitting diode 40 and resistor 52, but which will light when currents in excess of 20 milliamps flow through this parallel combination. Thus it may be seen, that by picking resistor 52 according to the constraints described above, light emitting diode 40 will not light when $I_o$ consists only of leakage current flowing through leakage conductance 35, but will light when current $I_p$ due to telephone 27 going off hook is added to $I_o$.

Since in the example used, $I_p$ plus $I_f$ is less than the pull in current for relay 25, it is necessary that $I_1$ be increased to a point equalled to or greater than this pull in current. With $I_p$ flowing through conductors 51 and 56, sufficient current flows through LED 40 to light the LED, thereby greatly increasing the conductance of photo-resistor 41. As the conductance of photo-resistor 41 increases, current $I_s$ increases from its formerly negligible value to a value on the order of tens of milliamps.

As is known to those skilled in the art, the gate to cathode junction of SCR 48 which appears between points 46 and 50, may be conveniently modeled as a forward biased silicon diode. $I_s$ will flow through shunt conductor 42 into point 46 at which point current $I_s$ divides between resistor 45 and gate 47. As is known to those skilled in the art, the selection of resistor 45 will control the amount of current flowing into point 46 which is required to fire SCR 48. In the present invention, the value of resistor 45 is chosen such that a value of $I_s$ flowing into point 46 which fires SCR 48 is such that $I_s$ plus $I_p$ is greater than or equal to the pull-in current of central office relay 25. It may therefore be seen, that when telephone 27 goes off hook, light emitting diode 40 increases the conductance of resistor 41 until a sufficient shunt current, $I_s$, is induced between points 67 and 46 to pull in central office relay 25. Once an $I_s$ of sufficient magnitude to assure pull-in of central office relay 25 is obtained, $I_s$ will increase to a magnitude sufficient to fire SCR 48.

The firing of SCR 48 causes the voltage between points 49 and 50 to drop to approximately one forward biased junction voltage, thereby assuring that insufficient voltage appears across light emitting diode 40 for it to emit light. It can therefore be seen that the firing of SCR 48 darkens diode 40, thus greatly reducing the conductance of photo-resistor 41 and effectively extinguishing current $I_s$. Under these circumstances, $I_o$ will be equal to few milliamps but the great majority of $I_1$ will flow between points 49 and 50 through SCR 48. It may thus be seen that the first preferred embodiment of the present invention is sensitive to the presence of a current, $I_p$, flowing in the loop which will flow as a portion of $I_o$ for a sufficient time to increase the conductance of photo-resistor 41 so that a shunt current $I_s$ is induced which will make $I_1$ of sufficient magnitude to pull in central office relay 25. Very soon after this has occurred, SCR 48 will fire due to the increasing magnitude of shunt current $I_s$ and thus darken LED 40 and effectively extinguish shunt current $I_s$. Therefore, one of the advantages of the present invention over prior loop extenders may be easily appreciated. This advantage is that a shunt is placed across the loop in order to draw a sufficient pull-in current from the central office equipment, and upon establishment of a sufficient pull-in current in the subscriber loop, the shunt is then removed.

Once central office relay has been pulled in, a holding current will be maintained in the loop by off hook resistance 29. In conventional telephone circuitry, this current will be on the order of 15 milliamps. As is known to those skilled in the art, a parameter of a silicon controlled rectifier such as SCR 48 is the SCR holding current. This is a value of current flowing from the anode to the cathode of the SCR that, once the SCR has fired, will maintain the device in its conducting region. While SCR holding current is conventionally specified as a guaranteed maximum required current to maintain the conducting state of the SCR, holding current is herein defined as the minimum current required to maintain SCR 48 in its conducting state. This is a parameter which may be easily ascertained for any given physical SCR, and as will be apparent below, is an important parameter in constructing an embodiment of the present invention. The fundamental requirement for SCR holding current of SCR 48 in the embodiment shown in FIG. 1 is that the SCR holding current be greater than the maximum allowable leakage current $I_f$, and less than the current $I_p$ flowing between point 65 and 66 in response to telephone 27 going off hook. This is due to the fact for the embodiment shown in FIG. 1 to operate properly, SCR 48 must continue to conduct while telephone 27 remains off hook (even when leakage conductance 35 equals 0), and must extinguish when telephone 27 goes on hook, terminating $I_p$ even when the worst case $I_f$ is present in the loop. As will be apparent to those skilled in the art, silicon controlled rectifers with holding currents which fall in a range between a specified maximum allowable leakage current ($I_f$) and a specified minimum telephone operating current ($I_p$) are readily available.

Thus by choosing SCR 48 such that its holding current is within the range set forth above, it may be seen that once telephone 27 goes off hook, $I_s$ increases so as to pull in central office relay 25, and then returns to a negligible value when SCR 48 fires shunting light emitting diode 40. It may further be seen that this condition will be maintained until telephone 27 is again placed on hook, which will lower the current flowing between points 49 and 50 to a value less than the SCR holding current of SCR 48. Thus it may be seen that the present invention places a shunt across a subscriber loop between point 67 and 68 in response to telephone 27 going off hook and that this shunt is maintained long enough to pull in central office relay 25 and is then removed from the loop. It may further be seen that the present invention may be considered a variable shunt conductance as embodied by photo-resistor 41, which is controlled by a control means comprising SCR 48, light emitting diode 40, and resistor 52. While SCR 48 is conducting, almost all of loop current $I_1$ will flow through SCR 48 between points 49 and 50. When SCR 48 is cut off, the portions of loop current $I_1$ consisting of $I_p$ and $I_f$ will flow through the parallel combination of light emitting diode 40 and resistor 52. Therefore the aforementioned control means is responsive to the loop current both when SCR 48 is conducting and not conducting.

Since shunt current $I_s$ flows through photo-resistor 41 into point 46, and gate 47 of SCR 48 is connected to point 46, it may seen that the control means (which includes SCR 48) is also responsive to the current in the shunt flowing between points 67 and 68.

From the foregoing description of operation of the preferred embodiment shown in FIG. 1, it may further be ascertained that the control means comprising SCR 48, light emitting diode 40 and resistor 52 has a hysteresis in its response to the loop currents. When SCR 48 is cut off, the resistance of photo-resistor 41 decreases in response to increases in $I_o$. This causes corresponding increases in $I_s$ until the point at which SCR 48 fires. Therefore when the control means is in a first state in which SCR 48 is nonconducting, the control means is responsive to the presence of a loop current on the order of $I_p$ induced by telephone 27 going off hook; but when the control means is in a second state in which SCR 48 is conducting, the control means is unresponsive to currents of this magnitude flowing in the loop until the loop current drops below the SCR holding current of SCR 48.

Another advantage of the present invention over other subscriber loop extenders is that it is not prone to cause false ring trips. Consider that central office relay 25 is the ring relay which is to be tripped in response to telephone 27 going off hook while ringing voltage source 26 is applying a AC ringing voltage between points 60 and 61.

As will be known to those skilled in the art, the function of the first preferred embodiment shown in FIG. 1 may be understood with the aid of superposition of two voltage sources at point 60. The first voltage source is a conventional central office battery (not shown) which produces approximately 50 volts DC between tip 21 and ring 22 of the subscriber loop. The other voltage source between tip 21 and ring 22 is conventional ringing voltage source 26 that provides an AC voltage between point 60 and 61. As is known to those skilled in the art, the root mean square value of the ringing voltage of a conventional telephone central office is approximately three times that of the DC voltage maintained between tip 21 and ring 22.

When telephone 27 is on hook, switch 30 is in contact with point 31 and ring detector 28 is connected between points 65 and 66. Since ring detector 28 comprises a series capacitance inductance, no direct current component of $I_p$ will appear when telephone 27 is on hook. As is known to those skilled in the art, ring detector 28 is tuned to the resonant frequency of ringing voltage generator 26 and therefore passes an alternating current $I_p$ between points 65 and 66 when ringing voltage is applied between points 60 and 61. Prior to application of ringing voltage 26, the control means of the first preferred embodiment has been in the state referred to as a first state above, and therefor SCR 48 was non conducting. Because of this, when telephone 27 on hook, the conductance of photo-resistor 41 is at its minimum value. When an incoming call excites ring voltage generator 26, AC current between points 65 and 66 is induced. On one half of a cycle of AC ringing voltage, point 60 is positive with respect to point 61, thus current $I_p$ will flow to point 49 through conductor 51 and thus appear as $I_o$ as shown in FIG. 1.

Conventionally, these currents are sufficient to light LED 40. On the other half of a cycle from ring voltage generator 26, when point 61 is positive with respect to point 60 (from the AC source) current flowing from point 50 to point 49 will flow through diode 55.

It might first appear that current through light emitting diode 40 which is sufficient to produce light and thereby raise the conductance of photo-resistor 41 would raise said conductance to a value great enough to draw a sufficient $I_p$ through ring relay 25 to trip the ring. As will be demonstrated hereinbelow, such is not the case.

Since ring detector 28 substantially blocks DC current, so long as light emitting diode 40 is dark, the only DC component of $I_l$ will be that of the leakage current $I_f$. As may be seen from inspection of FIG. 1, this DC current will be the same as that designated as $I_t$ on FIG. 1. Since the maximum allowable leakage current is insufficient to light LED 40, the current through light emitting diode 40 while telephone 27 is on hook and ring voltage generator 26 is excited may be considered to be from the positive half cycles of the AC ringing voltage. As stated above, this current will be sufficient to light LED 40 during application of ringing voltage. It has been found that when the AC ringing voltage from ring voltage source 26 is applied between points 60 and 61, LED 40 actually lights raising the conductance of photo-resistor 41. This in fact induces an $I_s$ between points 67 and 46 sufficient to cause current flow into gate 47 that will fire SCR 48. It has been found that upon each positive portion (point 60 positive with respect to point 61) of the AC ringing voltage, SCR 48 in fact fires thus extinguishing LED 40. It has further been found that the $I_s$ which fires SCR 48 is derived primarily from ring voltage source 26 and does not induce a current $I_t$ from the DC source sufficient to trip the ring 25.

It is believed that the increased magnitude of the ringing voltage applied between points 60 and 61 over the magnitude of the DC voltage is responsible for this result. Since the applied AC voltage is considerably larger than the DC applied between tip 21 and ring 22, this induces a greater voltage between points 67 and 68 from ring voltage generator 26. It may thus be seen that in order to provide sufficient shunt current $I_s$ into point 46 to fire SCR 48, the conductance of photo-resistor 41 must rise only to a value which is a fraction of that required to induce $I_s$ from the DC source alone which will fire SCR 48.

It is further belived that the fact that current through a series LC (28) lags applied voltage (26) helps to prevent false ring trip.

During the other half of the AC ringing cycle when point 61 is positive with respect to point 60 the current in SCR 48 will necessarily fall below its holding current thus cutting SCR 48 off. It may be therefore be seen that while SCR 48 fires during every cycle of the AC voltage from ringing voltage generator 26, it does so prior to the conductance of photo-resistance 41 being raised to a point which will pull an $I_t$ great enough to trip the ring. When telephone 27 is taken off hook, a DC $I_p$ appears which is provided through ring trip relay 25 and thus increases $I_t$ to a point which will trip the ring.

Figure 2:
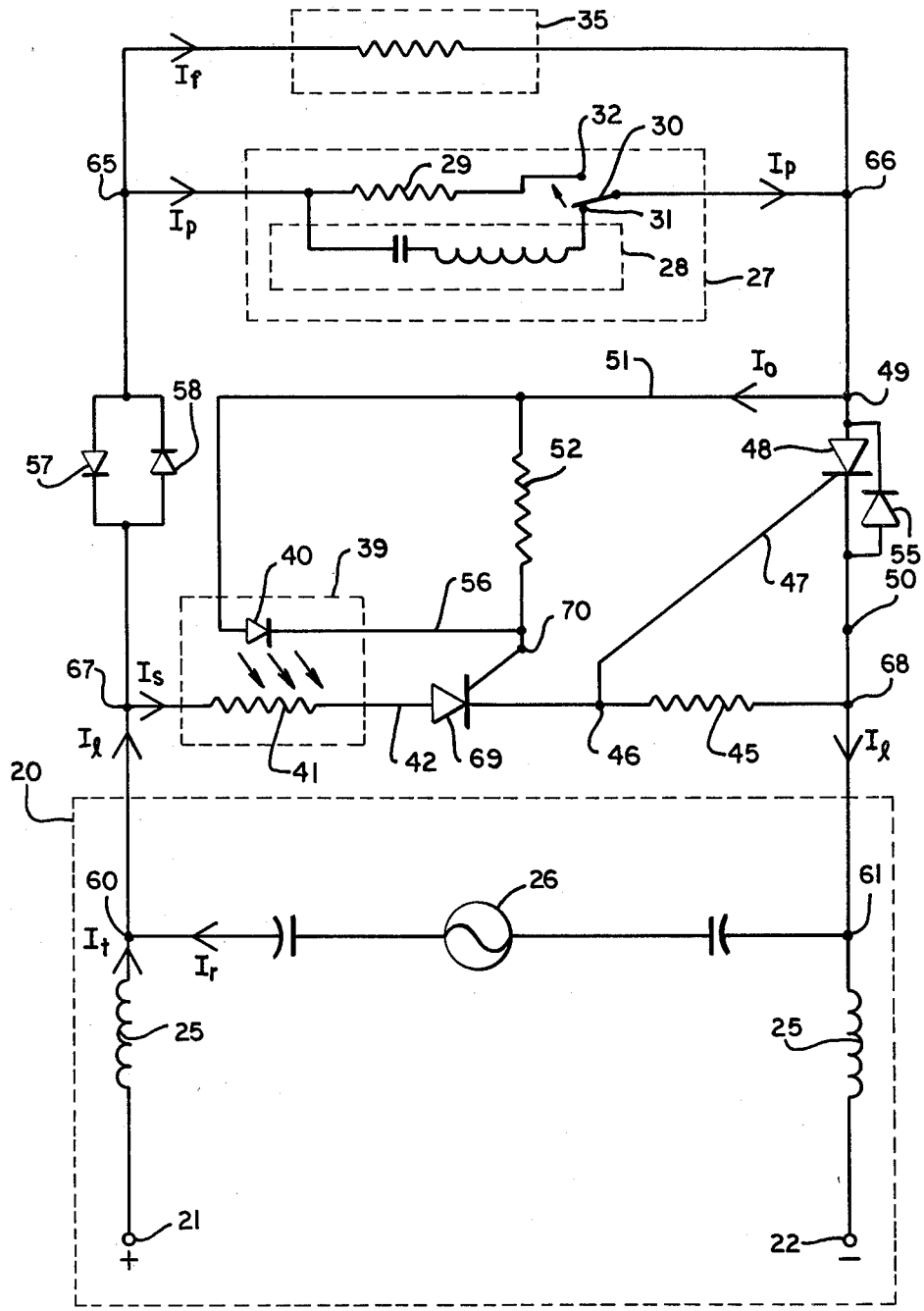
FIG. 2 is a schematic diagram of an alternate preferred embodiment of the present invention.

An alternative embodiment shown in FIG. 2 is substantially identical to that shown in FIG. 1 except that a second SCR 69 has been placed in the shunt between points 67 and 68. The gate 70 of SCR 69 has been attached to conductor 56, which is no longer returned to point 50.

SCR 69 is used to sharpen the falling edge of shunt current $I_s$. As is known to those skilled in the art, photo resistors such as photo resistors 41 exhibit a "memory" in that once that are excited by light and the light source is sharply cut off, the resistance value drops sharply at first but decays approximately exponentially as it goes toward its dark value. When loop current is first induced by telephone 27 going off hook before SCR 48 has fired, all of this current will appear as $I_o$ and will be directed through light emitting diode 40. The current path then proceeds to gate 70 of SCR 69, and being a relatively large current quickly fires SCR 69 thus opening a current path for the shunt between points 67 and 68. When $I_s$ reaches the level at which $I_s$ plus $I_p$ exceeds the pull-in current of central office relay 25, SCR 48 fires as previously explains shunting and thereby darkening the LED 40. As LED 40 is darkened, current $I_s$ quickly drops due to the sharp initial drop in the conductance of photo-resistive 41, $I_s$ will exhibit an approximately exponential decay when the conductance of photo-resistor 41 is controlled by the "memory" of the photo-resisted material. When SCR 48 is fired, current flow in conductor 56 and thus current flow into gate 70 of SCR 69 is substantially terminated. As will be known to those skilled in the art, with photo resistive materials and SCRs available at the present, physical components for SCR 69 and photo-resistor 41 may be selected such that conventional telephone central office battery voltages between points 67 and 68 will cause the current $I_s$ to drop sharply to a level below the SCR holding current of SCR 69 before the "memory" effect of photo-resistor 41 begins to dominate current flow.

SCR 69 should be chosen such that the maximum allowable leakage current $I_f$ entering its gate 70 will still maintain the forward breakover voltage of SCR 69 higher then the voltage between points 67 and 68. Resistor 52 may be required to prevent the maximum allowable leakage current from lighting LED 40 or may be unnecessary, depending on the characteristics of LED 40 and SCR 69. It will be apparent to those skilled in the art that the addition of a gate to cathode resistor from gate 70 to the cathode of SCR 69 may be used to vary the gate current to forward breakover voltage characteristic.

As will be apparent to those skilled in the art, the use of a high speed optical coupler for element 39 of the first preferred embodiment shown herein will allow the loop extender to accurately follow dial pulses present on the loop. With the addition of SCR 69 in the second preferred embodiment, slower speed optical couplers with a more pronounced memory characteristic may be used and dial pulses will be accurately followed.

The foregoing description of the first preferred embodiment and the alternate preferred embodiment have been exemplary and therefore the scope of the present invention shall be determined by the scope of the claims below.

I claim:

1. A loop extender for a telephone system including a central office, a subscriber loop which conducts a loop current and a termination of said subscriber loop, said termination being selectively operable to draw a predetermined off hook current from said central office through said subscriber loop, comprising:
a shunt resistance connected across said loop for conducting a shunt current;
control means responsive to said loop current flowing in said subscriber loop for causing said shunt resistance to vary in an inverse relationship to said loop current until said shunt current reaches a first predetermined value; and
switching means for providing a substantially instantaneous increase in said shunt resistance in response to said shunt current reaching said first predetermined value;
wherein said switching means renders said control means unresponsive to said loop current upon the occurrence of said increase until said loop current reaches a second predetermined value less than said predetermined off hook current.

2. Apparatus as recited in claim 1 wherein:
said shunt resistance comprises a photo sensitive resistor optically coupled to said control means, said control means comprising a light source carrying a portion of said loop current; and
said switching means comprises a silicon controlled rectifier having an anode and a cathode shunting said light source and a gate terminal responsive to said shunt current flowing through said photo sensitive resistor.

3. Apparatus as recited in claim 2 wherein said silicon controlled rectifier is a first silicon controlled rectifier and said switching means further includes:
a second silicon controlled rectifier having an anode and a cathode terminal connected in series with said photo sensitive resistor and a gate terminal connected in series with said light source.

4. In a telephone system having a relay for providing a connection between a subscriber loop and a central office line finder; said subscriber loop conducting a loop current; said relay being characterized by a predetermined current required to establish said connection and a predetermined holding current required to maintain said connection; said subscriber loop being terminated by a telephone characterized by a predetermined an off hook current less than said pull-in current but greater than said holding current; the improvement of a subscriber loop extender comprising:
a variable conductance shunt connected across said subscriber loop and providing a path for shunt current;
control means responsive to said loop current having a value greater than said off hook current for connecting said shunt across said subscriber loop;
wherein said control means effectively removes said shunt in response to said shunt current having a predetermined value greater than the difference of said pull in current and said off hook current.

5. A loop extender as recited in claim 4 wherein:
said control means is rendered unresponsive to said loop current upon each occurence of said shunt being substantially disconnected; and
said control means is rendered responsive to said loop current upon each occurrence of said loop current having a second predetermined value less than said holding current.

6. In a telephone system including a relay for providing a connection between a subscriber loop and a central office line finder, said subscriber loop conducting a loop current; said relay being characterized by a pull-in current required to establish said connection and a holding current required to maintain said connection; said subscriber loop being terminated by a telephone characterized by an off hook current less than said pull-in current and greater than said holding current; the improvement of a subscriber loop extender comprising:
a variable conductance shunt connected across said subscriber loop and providing a path for shunt current;
control means for varying said variable conductance shunt proportionally with said loop current in response to said loop current having a first predetermined loop value at least as large as said off hook current;

said control means substantially decreasing said shunt conductance and being rendered unresponsive to said loop current in response to said shunt current obtaining a predetermined shunt value greater than the difference of said pull in current and said off hook current; and said control means being rendered responsive to said loop current in response to said loop current falling below a second predetermined loop value less than said off hook current.

7. A subscriber loop extender as recited in claim 6 wherein:

said variable conductance comprises a photo sensitive current limiting device;

said control means comprises a light emitting source optically coupled to said photo sensitive current limiting device and electrically coupled to said subscriber loop; and a pnpn device having an anode and a cathode shunting said light emitting source and a gate terminal operatively connected to said variable conductance.

8. A subscriber loop extender as recited in claim 7 wherein:

said pnpn device is a first pnpn device and said control means further comprises a second pnpn device having an anode to cathode current path in series with said variable conductance.

9. In a telephone system including a relay for providing a connection between said subscriber loop and a central office line finder, said subscriber loop conducting a loop current; said relay being characterized by a pull in current required to establish said connection and a holding current required to maintain said second connection; said subscriber loop being terminated by a telephone characterized by an off hook current less than said pull in current and greater than said holding current; the improvement of a subscriber loop extender comprising:

a variable conductance shunt connected across said subscriber loop and providing a path for shunt current;

control means for varying said variable conductance shunt;

said control means being responsive to said loop current and said shunt current and being alternately in a first state and in a second state;

said first state being characterized by said control means varying said variable conductance in response to said loop current;

said second state being characterized by said shunt conductance being maintained at a value small enough to substantially terminate said shunt current independently of said loop current; wherein said control means makes a transition from said first state to said second state in response to said loop current obtaining a first predetermined loop value and said shunt current obtaining a predetermined shunt value; and said control means makes a transition from said second state to said first state in response to said loop current falling below a second predetermined loop value less than or equal to said first predetermined loop value.

10. A subscriber loop extender as recited in claim 9 wherein:

said variable conductance comprises a photo sensitive current limiting device;

said control means comprises a light emitting source optically coupled to said photo sensitive current limiting device and electrically coupled to said subscriber loop; and a pnpn device having an anode and a cathode shunting said light emitting source and a gate terminal operatively connected to said variable conductance.

11. A subscriber loop extender as recited in claim 10 wherein:

said pnpn device is a first pnpn device and said control means further comprises a second pnpn device having an anode to cathode current path in series with said variable conductance.

* * * * *